United States Patent [19]

Tazaki

[11] Patent Number: 4,710,958

[45] Date of Patent: Dec. 1, 1987

[54] CIRCUIT FOR CONTROLLING SEPARATION AND HIGH-CUT OPERATION OF A STEREO DEMODULATOR IN AN FM RADIO RECEIVER

[75] Inventor: Satoru Tazaki, Tokyo, Japan

[73] Assignee: Clarion Co., Ltd., Tokyo, Japan

[21] Appl. No.: 860,639

[22] Filed: May 7, 1986

[30] Foreign Application Priority Data

May 16, 1985 [JP] Japan .............................. 60-105658

[51] Int. Cl.$^4$ ............................................. H04H 5/00
[52] U.S. Cl. ......................................... 381/10; 381/13
[58] Field of Search ............................. 381/10, 11, 13; 455/297

[56] References Cited

U.S. PATENT DOCUMENTS

| | | | |
|---|---|---|---|
| 4,157,455 | 6/1979 | Okatani et al. ......................... | 381/11 |
| 4,416,024 | 11/1983 | Ugari et al. ............................ | 381/11 |
| 4,466,115 | 8/1984 | Hashimoto ............................. | 381/11 |
| 4,607,381 | 8/1986 | Shimizu ................................. | 381/10 |
| 4,612,662 | 9/1986 | Kuwajima et al. ................... | 381/13 |
| 4,620,315 | 10/1986 | Imagawa ............................... | 381/13 |

*Primary Examiner*—Forester W. Isen
*Attorney, Agent, or Firm*—Russell E. Hattis; Stephen R. Arnold

[57] ABSTRACT

A control circuit in an FM radio receiver includes a current mirror circuit which extracts a ripple component caused by a multipath disturbance and superposed on an S-meter output voltage from an intermediate frequency amplifier/detector of the FM radio receiver, and decreases the S-meter output voltage in response to the degree of the ripple component to use the decreased S-meter output voltage as a control voltage for control of separation and high-cut operations of a stereo demodulating stage of the FM radio receiver.

3 Claims, 8 Drawing Figures

CIRCUIT FOR CONTROLLING SEPARATION AND HIGH-CUT OPERATION OF A STEREO DEMODULATOR IN AN FM RADIO RECEIVER

FIELD OF THE INVENTION

This invention relates to an FM radio receiver, and more particularly to an improvement of a control circuit which generates a d.c. voltage for controlling separation and high-cut operation of a stereo demodulator in an FM radio receiver.

BACKGROUND OF THE INVENTION

An FM radio receiver, in general, comprises a front end including a tuner, intermediate frequency amplifier/detector, stereo demodulating stage and audio stage. Japanese Patent Publication No. 15499/82 proposes a circuit which is used in such an FM radio receiver to automatically control the stereo demodulating stage and reduce a noise entered therein.

FIG. 4 is a block diagram of an FM radio receiver of this type in which reference symbol ANT designates an antenna, 1 refers to a front end, 2 to an intermediate frequency (IF) amplifier/detector, 3 to a stereo demodulating stage, 4 to an audio stage, 5 to right (R) and left (L) speakers, and 6 to a control circuit.

Assume now that an FM wave having a frequency $f_0$ is entered in the receiver of FIG. 4 through the antenna ANT. The entered wave is converted to an intermediate frequency signal having a frequency component of 10.7 MHz by the front end 1. The intermediate frequency component is amplified and FM-detected, and converted to an audio output. If it is a stereophonic broadcasting, the audio output is divided into right (R) and left (L) components by the stereo demodulating stage 3. The audio output is amplified by the audio stage 4 and transmitted to the speaker 5. The IF amplifier/detector 2 also includes a means for generating a d.c. voltage responsive to the field intensity of the FM wave entered in the antenna ANT. The voltage is normally called "signal meter voltage" (hereinafter called "S-meter voltage") because it drives a signal meter provided in the front panel of an FM radio receiver to indicate the field intensity. The stereo demodulating stage 3 effects among other things separation control and high-cut control to reduce multipath noises. The separation control and high-cut control operations are controlled by the S-meter voltage which is closely related to the field intensity.

Assume here that a multipath disturbance occurs in which the FM transmitter signals arrive at the antenna over two or more paths, one directly arriving with a frequency $f_0$ and the others involving reflections from buildings or other obstacles having the same frequency and arriving later. The S-meter voltage $V_S$ momentarily decreases as shown in FIG. 5, and a ripple component $V_P$ corresponding to the reflections are generated below the reference voltage $V_0$.

The separation control and high-cut control operations of the stereo demodulating stage 3 serve to improve the signal-to-noise (S/N) ratio upon a rapid degradation thereof due to a decreased field intensity of the FM stereo transmitter signals. More specifically, since the S/N ratio is improved by 22 dB during monophonic reception as compared to stereophonic reception, a great degradation in the S/N ratio can be prevented by separation control and high-cut control responsive to the electric field intensity of the FM stereo transmitter signals. These controls are effected by the control circuit 6. However, the ripple component $V_P$ produced in the negative range during multipath reception as shown in FIG. 5 simply continues for a very limited time, and the voltage $V_S$ immediately returns to the original value $V_0$. Therefore, it is difficult to effectively activate the separation control and high-cut control in response to the ripple component $V_P$. In this connection, it is necessary to provide a delay in the change of the voltage $V_S$ following an increase or decrease of the ripple component $V_P$. More specifically, if a relatively long time is provided between a voltage drop of $V_S$ responsive to a multipath reception and restoration of the original voltage $V_0$, the separation control and high-cut control can sufficiently follow the change of the ripple component $V_P$. FIG. 4 shows among others the control circuit 6, which decreases the S-meter control voltage in accordance with the degree of the multipath disturbance.

One arrangement of the control circuit 6 is shown in FIG. 6 in which reference numeral 7 denotes an S-meter voltage input terminal, 8 refers to an amplifier, 9 to a negative rectifier, 10 to an adder, 11 to a separation/high-cut control voltage output terminal, and VR to a variable resistor. The ripple component $V_P$ generated by a multipath disturbance and superposed on the S-meter voltage $V_S$ is extracted via a capacitor $C_i$ and amplified by the amplifier 8. The ripple component $V_P$ from the amplifier 8 is rectified by the rectifier 9 into a negative voltage which in turn is added to the S-meter voltage by the adder 10 to decrease the level of the original S-meter voltage into a control voltage $V_C$ at the terminal 11. The control voltage $V_C$ activates separation and high-cut control operations of the stereo demodulating stage to reduce noises caused by the multipath disturbance and improve the S/N ratio.

FIG. 7 is a circuit diagram of the negative rectifier 9 and adder 10 included in the circuit of FIG. 6. Reference numeral 12 denotes an output terminal of the variable resistor VR (FIG. 6) and 13 designates an output terminal of the amplifier 8. The ripple component caused by the multipath disturbance and amplified by the amplifier 8 passes through a capacitor $C_3$ and negative-rectified by diodes $D_1$ and $D_2$ so as to negatively charge a capacitor $C_1$. When the difference between the negative voltage of the capacitor $C_1$ and a voltage at a point B becomes larger than a threshold voltage $V_D$ of a diode $D_3$, the capacitor $C_2$ discharges through a resistor $R_1$ and the diode $D_3$. As the result, a current flows through resistors $R_3$ and $R_2$ to charge the capacitor $C_2$, and decreases the voltage $V_C$ at a point C as shown in FIG. 8. Before the multipath disturbance component $V_P$ reaches a degree (a), the diode $D_3$ maintains the control voltage $V_C$ at $V_D$, and after the component $V_P$ exceeds (a), the control voltage decreases due to conduction of the diode $D_3$. When the multipath disturbance component $V_P$ is (b), the control voltage $V_C$ is $V_1$. In this case, the control voltage $V_C$ may take different values $V_2$, for example, in addition to $V_1$ at a fixed degree of the multipath disturbance component $V_P$, depending on the gain of the amplifier 8. That is, a voltage change ratio $\gamma_0$, i.e.:

$$\gamma_0 = \frac{\text{change in the control voltage}}{\text{degree of the multipath disturbance}}$$

varies depending on the gain of the amplifier as represented by:

$$\gamma_0 = \frac{V_0 - V_1}{b - a} \text{ or } \gamma_0 = \frac{V_0 - V_2}{b - a}$$

The gain of the amplifier 8 cannot be changed so much due to a restriction of a d.c. amplification ratio $h_{FE}$. Also, the use of a larger resistance in the adder 10 to increase the voltage drop invites an influence to the time constant fixed for a delayed charging of the capacitor $C_2$. Therefore, free selection of the voltage change ratio $\gamma_0$ cannot be expected by changes of the gain of the amplifier 8 nor the resistance $R_1$ in the adder 10 in the prior art circuit.

OBJECT OF THE INVENTION

It is therefore an object of the invention to provide a control circuit of an FM radio receiver which permits user's free selection of a voltage changing ratio, i.e. the change in a control voltage with respect to the degree of a multipath disturbance, which control voltage is obtained by decreasing an S-meter voltage by an amount of a ripple component caused by the multipath disturbance and superposed on the S-meter voltage and is used to control known separating and high-cut operations of a stereo demodulating stage of the FM radio receiver.

SUMMARY OF THE INVENTION

According to the present invention, there is provided a circuit for controlling separation and high-cut operation in a stereo demodulating stage of an FM radio receiver comprising:

voltage-current conversion means for converting into a current a ripple component voltage involved in an S-meter output voltage from an intermediate frequency amplifier/detector of said FM radio receiver;

a mirror circuit receiving said current from the voltage-current conversion means as a first reference current;

level fixing means for setting the level of said S-meter output voltage; and output means decreasing an output voltage from said level fixing means in response to an output current from said current mirror circuit and outputting the resulting voltage via a time constant circuit.

DETAILED DESCRIPTION

Figure 1:
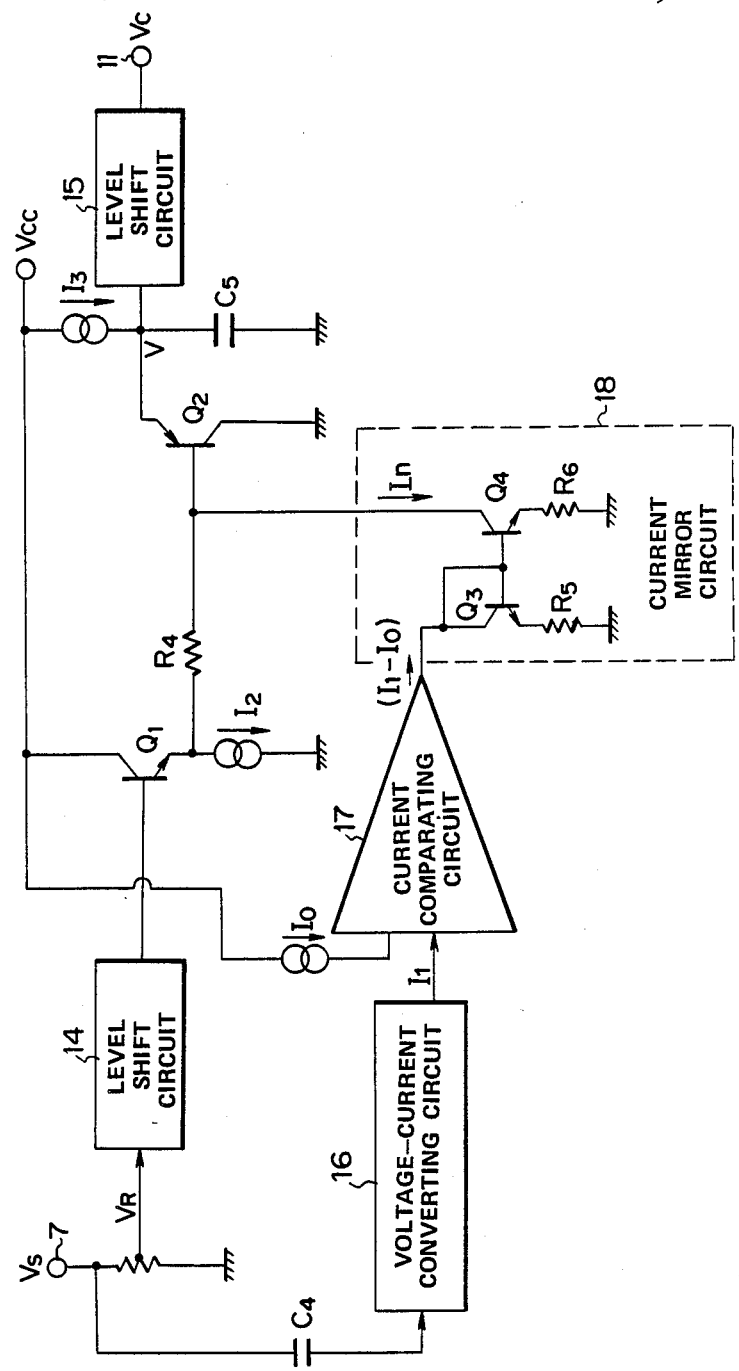
FIG. 1 is a circuit diagram of a d.c. voltage control circuit embodying the invention.

The invention is hereinbelow described in detail, referring to a preferred embodiment illustrated in the drawings.

FIG. 1 shows an arrangement of a control circuit embodying the invention for generating a high-cut & separation control voltage $V_C$. The circuit generally comprises level shift circuits 14-15, voltage-current converting circuit 16, a current comparison circuit, and a current mirror circuit (two-transistor current source) 18. The circuit further includes transistors $Q_1$ through $Q_4$, resistors $R_4$ through $R_6$, fixed current sources 19-20 and capacitors $C_4$ and $C_5$. The capacitor $C_5$ is used to provide a delay in the change of the S-meter voltage responsive to the ripple component $V_P$ as described before.

When no multipath disturbance occurs, the S-meter voltage $V_S$ is divided by a variable resistor $V_R$ into $V_0$ and level-shifted by $\Delta V$ in the level shift circuit 14. The base voltage of the transistor $Q_1$ becomes $V_0 + \Delta V$, and a voltage $V_0 + \Delta V - V_{BEQ1}$ appears at the emitter of the NPN transistor $Q_1$. Therefore, the base voltage of the PNP transistor $Q_2$ becomes $V_0 + \Delta V - V_{BEQ1}$, and the emitter potential of same becomes $V_0 + \Delta V - V_{BEQ2}$. Its output is shifted by $-\Delta V$ in the level shift circuit 15 into $V_0 + \Delta V - V_{BEQ1} + V_{BEQ2} - \Delta V$. Assuming that $V_{BEQ1} = V_{BEQ2}$ (=base-emitter voltage of the transistors $Q_1$ and $Q_2$), the control voltage $V_C$ at the terminal 11 becomes $V_0$.

When a multipath disturbance occurs, the ripple component $V_P$ superposed on the S-meter voltage $V_S$ is extracted by the capacitor $C_4$ and converted to a current $I_1$ by the voltage-current converter 16. The current $I_1$ is compared to a reference current $I_0$ in the current comparison circuit 17. The current comparison is effected to provide a threshold value as the diode $D_3$ in the prior art provides a threshold. The difference current $I_1 - I_0$ of the comparison circuit 17 is applied as a reference current to the current mirror circuit 18 including transistors $Q_3$ and $Q_4$ to generate a mirror current $I_n$ represented by:

$$I_n = \frac{R_5}{R_6} \cdot (I_1 - I_0)$$

The current $I_n$ flows through the resistor $R_4$ and causes a voltage drop $I_n R_4$. This causes the same voltage drop of $I_n R_4$ in the control voltage $V_C$ of the terminal 11. This is represented by:

$$V_C = V_0 + \Delta V - V_{BEQ1} - I_n R_4 + V_{BEQ2} - \Delta V = V_0 - I_n R_4 \quad (\because V_{BEQ1} = V_{BEQ2})$$

Therefore, the mirror current $I_n$ is controlled by the ratio between resistors $R_5$ and $R_6$. This means that the control voltage $V_C$ may be controlled as desired by a change of the ratio of the resistors.

In this case, the time constant for a change in the S-meter voltage $V_S$ is fixed by a fixed current $I_3$ and capacitor $C_5$ and is represented by:

$$\text{Changing time constant} = \frac{C_5 V}{I_3}$$

where V is the output voltage of the transistor $Q_2$ Since the time constant is not affected by the multipath conversion current, any change in the ratio between the resistors $R_5$ and $R_6$ to change the voltage drop does not changes the time constant.

Figure 2:
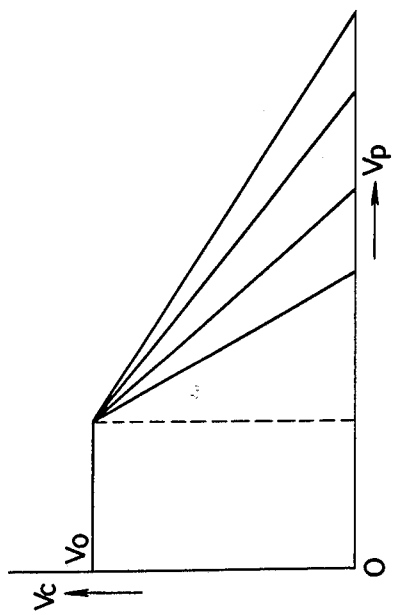
FIG. 2 is a current characteristic diagram of a current mirror circuit.
Figure 3:
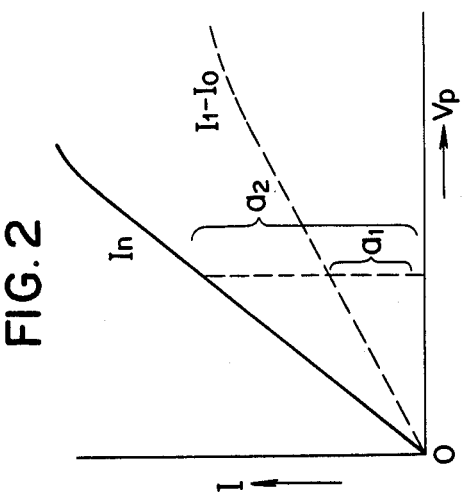
FIG. 3 is a diagram showing the change in a control voltage with, respect to a ratio between resistances.
Figure 4:
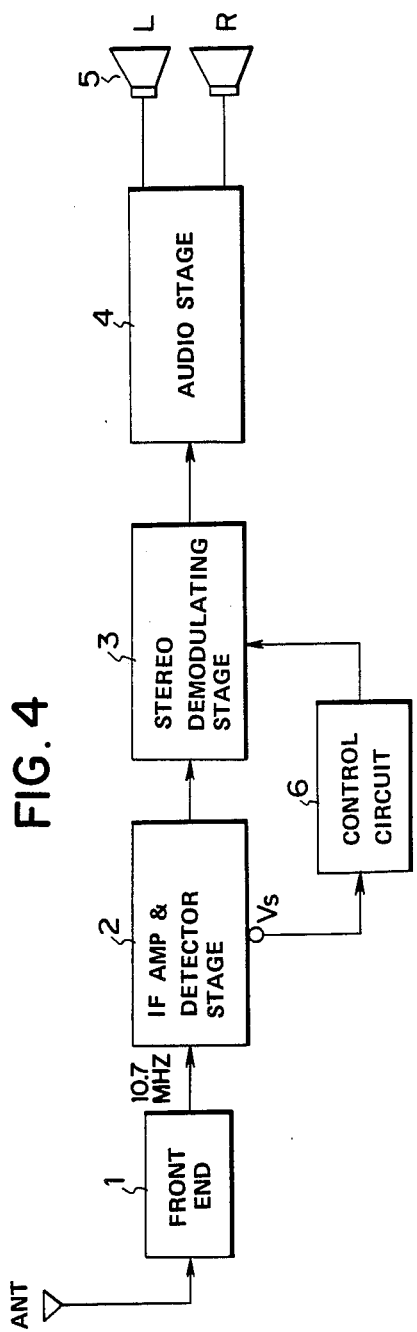
FIG. 4 is a block diagram of an FM receiver including a d.c. voltage control circuit.
Figure 5:
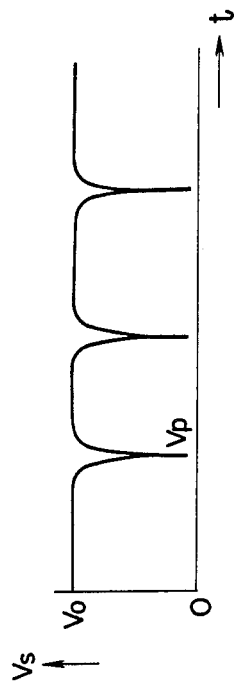
FIG. 5 shows a waveform of an S-meter voltage during multipath disturbance.
Figure 6:
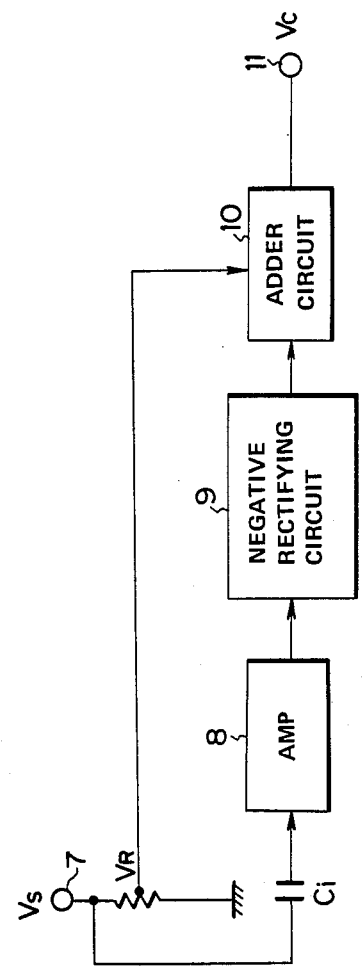
FIG. 6 is a block diagram of a prior art d.c. voltage control circuit.
Figure 7:
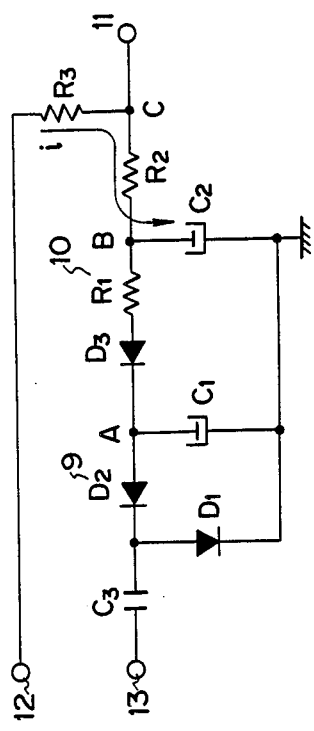
FIG. 7 is a circuit diagram of a negative rectifier and an adder involved.
Figure 8:
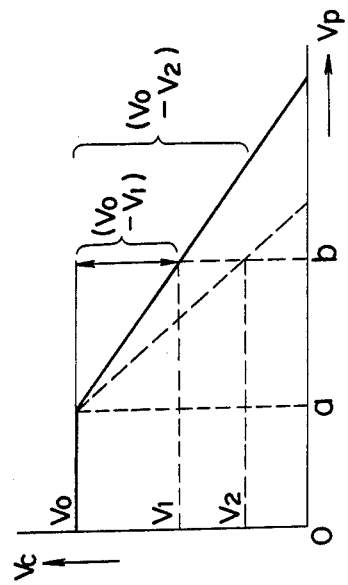
FIG. 8 is a diagram showing the relationship between the control voltage and a multipath disturbance component.

FIG. 2 shows the change in the current $I_n$ by a solid line and the change in the current difference $I_1 - I_0$ by a broken line with respect to the multipath disturbance component $V_P$ of the abscissa and the current $I_0$ of the ordinate. FIG. 3 shows the relationship between the multipath disturbance component $V_P$ of the abscissa and the control voltage $V_C$ of the ordinate, taking the ratio $R_4/R_5$ as a parameter. The inclination becomes larger as the ratio of the resistors increases.

As described, the invention circuit enables a user to select any desired degree of separation and high-cut operations of a stereo demodulating stage of an FM radio receiver by selecting the reduction amount of the multipath disturbance at a desired degree suitable for different areas where the FM wave condition varies, and this control never affects the time constant provided for a delayed change in the control voltage for separation and high-cut operations of the system.

The embodiments of the invention in which an exclusive property or priviledge is claimed are defined as follows:

1. In a stereo FM receiver having an S-meter responsive to a field strength indicating voltage supplied thereto and a stereo demodulator responsive to a control voltage supplied thereto for controlling adjusting the separation and high-cut properties of said demodulator, the improvement comprising:

control voltage generating means for generating said control voltage in response to said field strength indicating voltage;

voltage-current conversion means for converting to a ripple current a ripple component voltage present in said field strength indicating voltage;

a current mirror circuit responsive to said ripple current from the voltage-current conversion means for providing a mirror current corresponding thereto and having a controllably chosen ratio with respect thereto; and output means including a time-constant circuit and controllably responsive to said mirror current from said current mirror circuit for decreasing said control voltage in response to increase in said mirror current and outputting the resulting voltage via said time-constant circuit.

2. The circuit of claim 1 further comprising a current comparison circuit provided between said voltage-current conversion means and current mirror circuit, said current comparison circuit including one input for reception of a reference current and the other input for reception of said current from said voltage-current conversion means.

3. The circuit of claim 2 wherein said current mirror circuit includes at least two transistors and two resistors connected to individual emitters of said transistors, said mirror current being determined by the output current from said current comparison circuit and the ratio between said two resistors.

* * * * *